United States Patent [19]

Sadler

[11] Patent Number: 5,576,716

[45] Date of Patent: Nov. 19, 1996

[54] OWNER ORIENTED SYSTEM FOR LOCATING LOST OR STOLEN PROPERTY

[76] Inventor: Kermit M. Sadler, 17318 Tall Cypress Dr., Spring, Tex. 77388

[21] Appl. No.: 351,494

[22] Filed: Dec. 7, 1994

[51] Int. Cl.⁶ .......................................................... G01S 5/02
[52] U.S. Cl. .......................................... 342/357; 342/457
[58] Field of Search ....................................... 342/457, 357, 342/450; 364/449, 460

[56] References Cited

U.S. PATENT DOCUMENTS

| | | |
|---|---|---|
| 3,656,111 | 4/1972 | Royster, Sr. . |
| 3,720,911 | 3/1973 | Bomar, Jr. . |
| 3,906,472 | 9/1975 | Guadara et al. . |
| 4,072,850 | 2/1978 | McGlynn . |
| 4,658,237 | 4/1987 | Williamson . |
| 4,740,792 | 4/1988 | Sagey et al. . |
| 4,742,357 | 5/1988 | Rackley . |
| 4,782,321 | 11/1988 | Colvin . |
| 4,804,937 | 2/1989 | Barbiaux et al. . |
| 4,818,998 | 4/1989 | Apsell et al. . |
| 4,884,208 | 11/1989 | Marinelli et al. . |
| 4,904,983 | 2/1990 | Mitchell . |
| 4,910,493 | 3/1990 | Chambers et al. . |
| 4,924,206 | 5/1990 | Ayers . |
| 4,947,151 | 8/1990 | Rosenberger . |
| 4,990,890 | 2/1991 | Newby . |
| 5,081,667 | 1/1992 | Dori et al. . |
| 5,119,102 | 6/1992 | Barnard . |
| 5,140,308 | 8/1992 | Tanaka . |
| 5,159,344 | 10/1992 | Robinson et al. . |
| 5,223,844 | 6/1993 | Mansell et al. . |
| 5,247,564 | 9/1993 | Zicker . |
| 5,276,728 | 1/1994 | Pagliaroli et al. . |
| 5,280,267 | 1/1994 | Reggiani . |
| 5,299,132 | 3/1994 | Wortham . |
| 5,311,197 | 5/1994 | Sorden et al. . |
| 5,317,323 | 5/1994 | Kennedy et al. . |
| 5,319,698 | 6/1994 | Glidewell et al. . |
| 5,491,636 | 2/1996 | Robertson et al. ................... 364/432 |

*Primary Examiner*—Thomas H. Tarcza
*Assistant Examiner*—Dao L. Phan
*Attorney, Agent, or Firm*—Sue Z. Shaper; Butler & Binion, L.L.P.

[57] ABSTRACT

An owner oriented system for locating lost or stolen property comprising a GPS module, micro computer, a modem and a phone installed in a vehicle; regularly and automatically computing position data; and, under control of a program, storing novel position data in a buffer and downloading upon proper request from an incoming call.

10 Claims, 2 Drawing Sheets

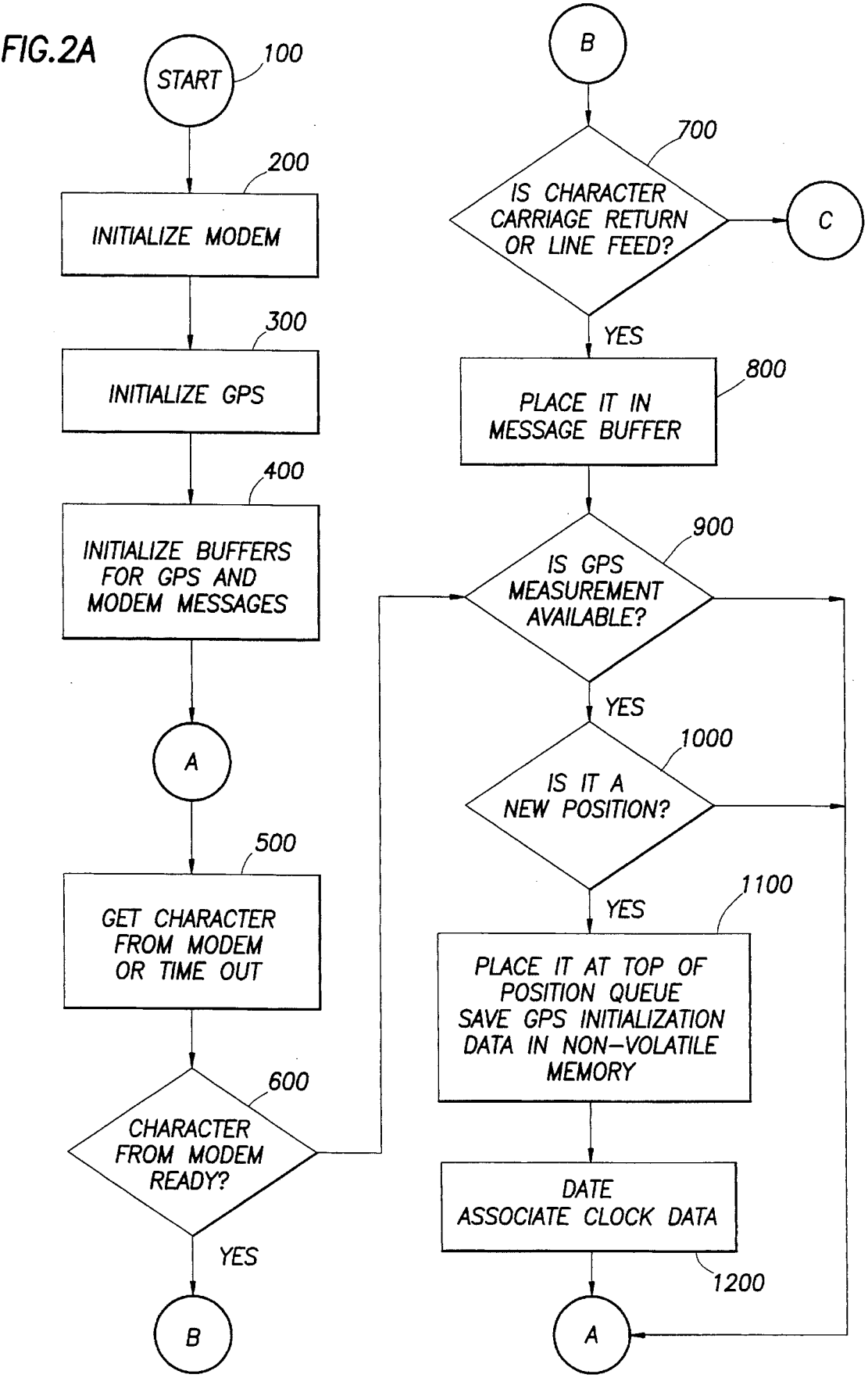

OWNER ORIENTED SYSTEM FOR LOCATING LOST OR STOLEN PROPERTY

FIELD OF INVENTION

The invention is related to the field of radio location systems and, in particular, to an owner oriented, bulletin board type system for locating lost property.

BACKGROUND OF INVENTION

There are over a million vehicles stolen in the U.S. every year at great loss to owners and insurers. Most effort heretofore focused on preventing the theft have mixed results. The recovery, if any, of stolen vehicles is usually accidental. This invention combines existing technologies to create a unique owner oriented system to locate a lost vehicle. The system may increase the odds for recovering the vehicle intact and possibly for apprehending the thief.

The Global Positioning System (GPS) satellites have been used extensively as a navigational aid. Standalone GPS receiver units have existed for some time and have had standard interfaces to navigation computers. Commercial systems of GPS units have been used to track delivery vehicles and taxi cabs via specialized telecommunications systems and base stations not readily available to the public.

This invention provides for the location of a subject's vehicle or property to be obtained through use of GPS receiver units in a computer "bulletin board type" framework, using readily available software that millions of people already use to connect to computer bulletin boards and download information. Standard hardware is utilized, comprising e.g. a PC connected to a modem and a cellular phone and a GPS receiver unit communicating with another PC/modem/phone. The invention uses the same radio telephone or cellular telephone technology which is already available to the public in most of the areas in which it would be needed.

DESCRIPTION OF THE PRIOR ART

The problem of lost or stolen vehicles has been addressed by a variety of means which can generally be divided into categories of alarms and prevention devices, on the one hand, and locating systems and tracking systems on the other. Alarms and prevention systems have been available to individuals in a variety of forms and features. Locating and tracking systems have generally relied on a base station with complex radio transmission systems that requires licensing and significant investment.

Rackley discloses in U.S. Pat. No. 4,742,357, issued May 1988, a unit which can broadcast the LORAN determined position of a vehicle via a variable frequency radio transmission in response to a request broadcast on a specific frequency containing an identification code of the unit that is thereby requested to respond. This necessitates the use of a licensed radio broadcast system.

Drori in U.S. Pat. No. 5,081,667 issued January 1992, discloses a system for interfacing with a global positioning system and a cellular phone. The commands received, as preferably taught and disclosed, are touch tone signals which this interface decodes via a CD22204 IC chip (col 4 line 20). Thus, the communication would be conducted in analog audio from a touch tone phone; position data is taught to be returned as voice synthesized audio. Setting options and controlling the device are preferably done through the digits of a telephone key pad. The operator must then remember or record the enunciated position data. More particularly, Drori teaches a system in which, prior to creating any tracking data, an on board security system is "tripped" and an outgoing call must have been completed, the latter to a user-designated telephone number. Only with such conditions satisfied is live real time vehicular position data is received, computed and output. In contrast, the present invention regularly and automatically receives, computes and stores location measurements of the vehicle. A memory buffer regularly and automatically loads, according to a queuing algorithm, successive position measurements, preferably tagged with a time and date. The memory buffer can be downloaded upon request through serial communication using a standard modem and consumer mobile phone. In such a manner the present invention bears analogy to a common "computer bulletin board". The system is simple, straightforward and easy for an ordinary citizen to utilize.

As an added feature, the system of the present invention does not store or download successive measurements unless they reflect new positions. Detecting new positions takes into account standard errors in GPS positioning.

Mansell, in U.S. Pat. No. 5,223,844 issued June 1993, discloses a tracking system of mobile units transmitting, via a cellular phone, their positions to a Control Center. The Control Center is comprised of a communications controller coupled to a display controller, each capable of handling multiple devices. The transmission of position data is triggered by "an event" at the mobile unit. The operational methodology does not provide for methodical regular queuing and storing of novel location data in a portable computer memory and the serial downloading of stored position data from an onboard computer buffer as a result of a proper call to the onboard phone.

Sorden, in U.S. Pat. No. 5,311,197 issued May 1994, also discloses reporting location when triggered by an abnormal event, as sensed at the vehicle, coupled with sensing a "vehicle operating parameter".

It can be seen from the above that there is a lack in the industry, an absence of a simple, owner oriented method for locating an owner's own lost vehicle (or other property) using common communications software and hardware widely available and used to communicate with computer bulletin boards and other computers. Such communications use a common telephone system or other data communications network, subscription to which is publicly available. Any user programming, such as setting passwords, could be done through this same dial up personal computer system.

The mobile equipment, including navigational components, is located in the property to be protected and provides for the periodic gathering and storing of position data from a Global Positioning System. In such a manner downloaded data indicates at least a historic route taken, even in the event that a request for position is made at a time when the positioning signals are obscured.

SUMMARY OF THE INVENTION

This invention provides an owner oriented system for locating lost or stolen vehicles, boats, or other property. A mobile system is hidden in the vehicle, including a computer coupled via a modem to a radio telephone or cellular telephone; a module including a computational and communication unit that monitors the global positioning satellites (GPS) through an attached antenna and calculates position data from the signals they provide and conveys this position information to the computer; and a monitor program running on the computer. The system is appropriately connected to a power source. The monitor program regularly and automatically obtains information on position from the attached GPS module and stores novel position data as the last of a set of recent position data in a memory buffer. The monitor program also regularly and automatically monitors a modem which answers incoming calls to a phone and establishes a dial-up asynchronous serial data communications link with any caller. When any such link is established, the monitor program scans incoming messages for an appropriate request to provide its location, in response to which the monitor program transmits the buffered set of recent position data over the data link. This dial-up request for position data could be made from any personal computer with a modem, a telephone line, and any of the available serial communications programs that can receive the data transmitted from the monitor program.

BRIEF DESCRIPTION OF THE DRAWINGS

FIG. 2A and 2B is a flow diagram of the logic of the program running in the mobile system.

DETAILED DESCRIPTION OF PREFERRED EMBODIMENTS

The GPS module of the preferred embodiment is comprised of a GPS receiver, antenna and GPS computational and communication unit. Standard components are available for sale. The vehicle located equipment includes a radio telephone or cellular telephone, where both the phone and GPS receiver are connected via appropriate I/O interfaces to a computer with memory which is running a monitor program. All systems are operatively connected to a power source, such as the vehicle battery.

Figure 1:
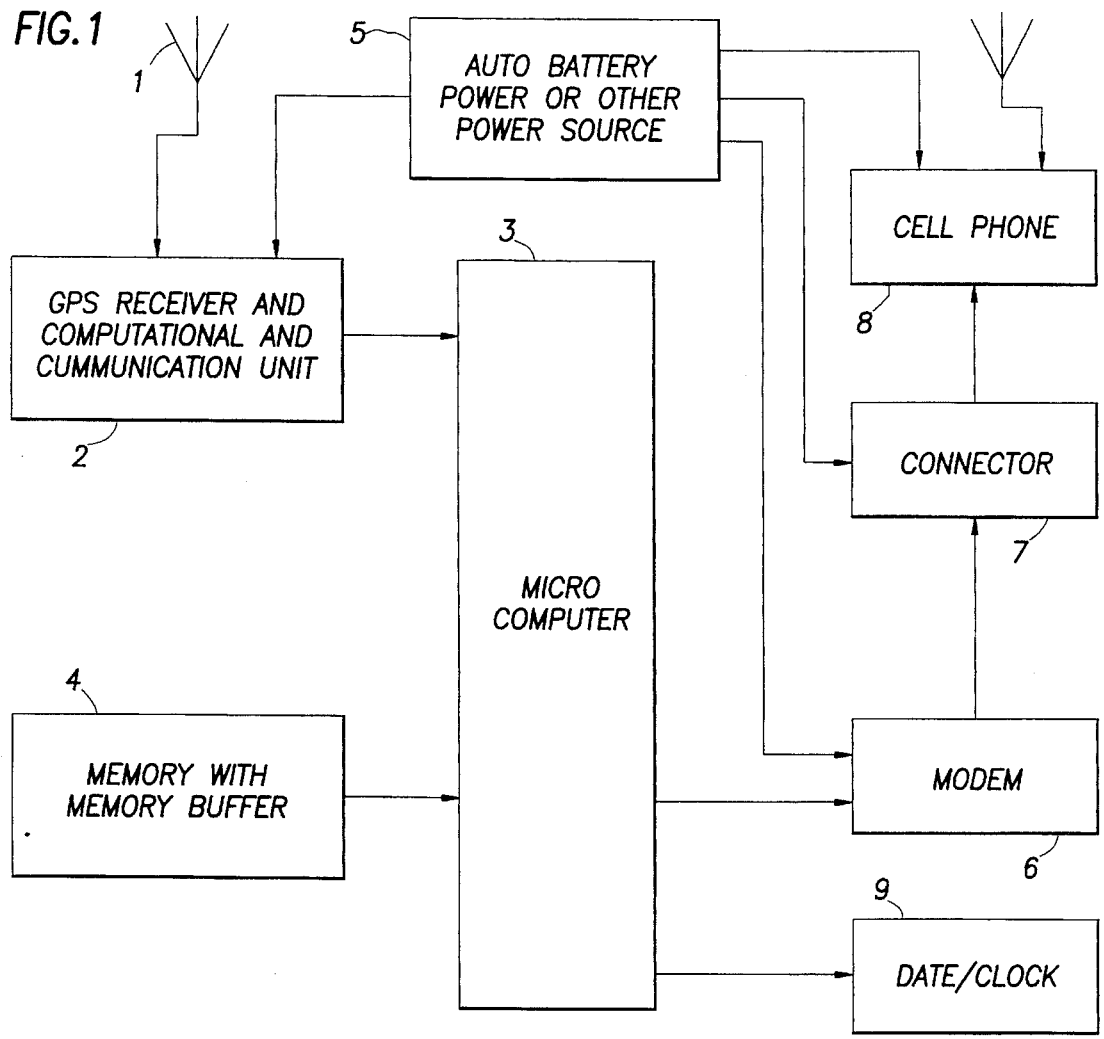
FIG. 1 is a schematic view of the components of the mobile system.

Referring to FIG. 1, the GPS receiver and computational and communication unit 2 can be a Trimble Mobile GPS module or a Trimble S-VeeSix GPS receiver module. It can use an antenna 1 such as a Trimble model 18334. The antenna can comprise a thin capacitor or an electric microstrip dipole, that can be inconspicuously attached to a vehicle.

The GPS receiver module is connected to micro computer 3 via an appropriate interface such as an RS232 or PCMCIA connection. Micro computer 3 can be a personal computer comprising an INTEL 80386 which has memory 4 consisting of volatile memory and at least some non-volatile memory, which could be a disk drive, in which to buffer and store position data and control information such as authorization codes and programs. Date\Clock 9 can be attached to micro computer 9. Power can be provided from the vehicle battery 5 or other suitable batteries. The micro computer is connected to a smart modem 6 which connects to a cell phone 8, with antenna, such as a Motorolla Digital Personal Communicator. The modem to cell phone connection 7 is made via a connector such as the Motorolla Portable Cellular Connection model SLN3032A.

Figure 2B:
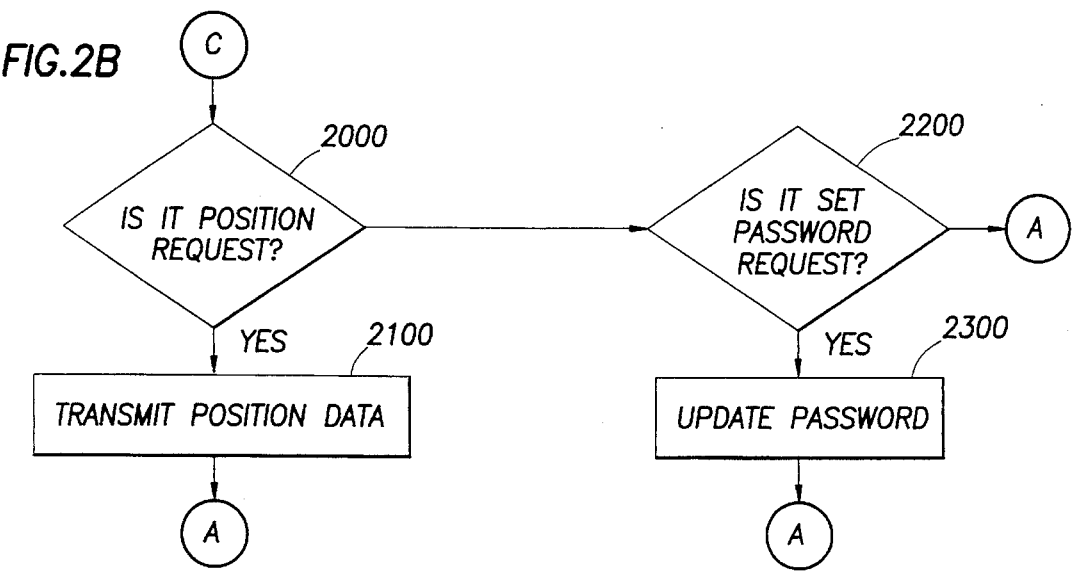

Referring to FIG. 2A, the computer program logic starts on power up at block 100, and initializes the smart modem at block 200 by sending a modem initialization string setting auto-answer, the initial baud rate, and any other options unique to the modem and setting UART registers to 8 bit, no parity, and one stop bit. At block 300 the GPS module is initialized as per instructions from the vendor for that module. At block 400 memory buffers for incoming messages and GPS positions are initialized.

Block 500 is the beginning of a continuous loop. In this block a character is requested from the modem if available; otherwise a time out indicator is returned. At block 600 a test is made as to whether a character was returned and if not a branch is taken to block 900; otherwise the logic continues with block 700. At block 700 the character received is tested for a carriage return or line feed, which would indicate an end of message, in which case a branch is taken to block 2000 to process a completed incoming message. Otherwise the logic falls through to block 800 where the character is placed in a message buffer. Next block 900 checks if a GPS measurement is available and if not a branch is taken back to block 500 to repeat the process. If a GPS measurement is available it is checked to determine if it comprises novel position data in block 1000. In that there is an inherent inaccuracy in GPS signals and a stationary unit may return positions randomly distributed around an exact position, to determine if the unit is actually moving and that the measurement is novel, block 1000 may simply determine that the position data is novel if it has changed by more than twice the expected inaccuracy. If the data comprises novel position data, control passes to block 1100 where the data is placed at the top of a queue of positions. In block 1200 the data may be associated with clock data, such as date and time. The source of the date and time data may be an attached date/clock or GMT data from the GPS module, or both. Whether or not novel, the logic returns to block 500. When the logic branched from block 700 to block 2000, FIG. 2B, it had been determined that a completed logical message had been received. Block 2000 determines if it is a request for position with the current password or authorization code. If it is, the logic falls through to block 2100 where the queue of position buffers are serially downloaded and transmitted and control then branches back to block 500. If the message was not a request for position, the logic flow passed from Block 2000 to Block 2200 which determines if the current password is given with a request to change it to a new password. If not control branches back to block 500. If it is, the logic falls through to block 2300 where the password is updated and control then branches back to block 500.

While specific embodiments and features of the invention have been disclosed herein, it will be readily understood that the invention encompasses all enhancements and modifications within the scope and spirit of the following claims.

What is claimed is:

1. An owner oriented system for locating lost or stolen property, comprising:

(a) powering up a GPS module including a receiver, an antenna and a GPS computational and communications unit operatively connected within a vehicle to a microcomputer attached to a memory having a buffer and a modem attached to a mobile phone; and (b) regularly and automatically receiving GPS signals through the antenna into the GPS receiver and computational and communication unit; converting the signals to position data;

(c) regularly and automatically testing for availability of position data from the GPS module through control of an activated program in the microcomputer;

(d) testing position data for novelty;

(e) queuing in a memory buffer novel position data;

(f) regularly and automatically testing for an incoming call through the mobile phone;

(g) testing an incoming call for a password and a vehicle position request; and (h) serially downloading contents of a buffer upon the detection of the password and a position request.

2. The system of claim 1 that includes, through control of the activated program:
   initializing the modem, including setting auto-answer, baud rate and register bit format;
   initializing the GPS module; and
   initializing a memory buffer.

3. The system of claim 1 wherein the microcomputer and memory comprise a PC.

4. The system of claim 1 wherein testing position data for novelty comprises testing the data for deviation from prior data cued into memory by an amount greater than twice an average estimated error for GPS measurements.

5. The system of claim 1 that includes generating an incoming call from a remote PC computer attached to a modem and a phone.

6. The system of claim 1 wherein receiving signals includes using an antenna comprising a thin capacitor.

7. The system of claim 1 that includes, through control of an activated program,
   testing an incoming call for a reset password request; and
   updating a password used in a password test.

8. The system of claim 1 that includes associating a clock time with each position data cued into the buffer.

9. The system of claim 8 that includes associating a date from a clock attached to the portable computer with position data cued into the buffer.

10. The system of claim 1 wherein the vehicle comprises an automobile and a power source for powering up comprises an automobile battery.

* * * * *